United States Patent Office 3,039,976
Patented June 19, 1962

3,039,976
POLYURETHANE FOAM AND PREPARATION OF SAME
Robert K. Barnes, Charleston, Robert W. McLaughlin, Belle, and Fritz Hostettler, Charleston, W. Va., assignors to Union Carbide Corporation, a corporation of New York
No Drawing. Filed Aug. 10, 1959, Ser. No. 832,471
7 Claims. (Cl. 260—2.5)

This invention relates to foamed polymers derived from isocyanate-modified alkylene oxide addition products of tetramethylolcyclohexanol and to their method of preparation.

It has been proposed heretofore to prepare foamed polymers by forming a polyester of a triol and a dicarboxylic acid, e.g., glycerol or trimethylol propane with adipic acid, and reacting the terminal active hydrogens of the polyester with a diisocyanate. The isocyanate-modified polyester is simultaneously or stepwise foamed by internal development of carbon dioxide and cross linking of the modified polyesters or by means of a blowing agent which vaporizes at or below the temperature of the foaming mass. Foams of this type have given promise of finding wide utility in the field of insulation and structural reinforcement. They also have given promise of being more versatile in that they can be foamed in place and thereby effect an obvious savings in labor and handling.

The discovery has now been made that foamed polymers of widely varying and preselected properties can readily be prepared from isocyanate-modified alkylene oxide addition products of tetramethylolcyclohexanol. The foamed polymers of the invention can be rigid or flexible, open-celled closed-celled and the flexible foams may be resilient or flaccid. The alkylene oxide-tetramethylolcyclohexanol addition products hereinafter described are especially suited for obtaining rigid foams which are characterized by good compression strengths.

The foamed products of the invention have the advantage of being capable of preparation without the application of external heat and of having high and low density by suitable modification, good resistance to solvents, and little tendency to support combustion. Another advantage that is most desirable from a commercial point of view is that the difficulties heretofore experienced in removing water of condensation from the polyesters and of keeping water out of the reaction until the proper time is very much reduced in that the alkylene oxide addition products utilized herein are formed without formation of water of condensation.

As used herein throughout the specification and claims, the term "isocyanate" refers to organic polyisocyanates. The term "residue," in reference to organic polyisocyanates, refers to the organic portion of an isocyanate compound exclusive of the reactive isocyanate groups. The term "isocyanate-modified . . . addition products" refers to an alkylene oxide-tetramethylolcyclohexanol reaction product in which the hydroxyl groups thereof are connected to organic polyisocyanate residues by means of a urethane linkage. The term "polyalkyleneoxy" as employed herein refers to at least one or more alkylene groups separated by a divalent oxy group.

In accordance with the invention urethane foams are prepared by forming a foamant polymer having reactive hydroxyl groups which comprises an alkylene oxide addition product of tetramethylolcyclohexanol, extending the polymer, building up the network polymer and developing the foam reaction by means of water and polyisocyanate. The network formation and building up of the foam can take place substantially simultaneously, as in the so-called "one shot method," or in more or less distinct steps as in the semiprepolymer technique. For most economical operation and directness of procedure, as well as continuous operation, it is preferred to prepare the foamant, i.e., the alkylene oxide-tetramethylolcyclohexanol addition product, in a first stage and then effect substantially simultaneous network and foam development in a second stage by admixing the foamant, polyisocyanate and water in the presence of a catalyst, or by partially extending the alkylene oxide-foamant product with isocyanate and then adding the foamant and water in a subsequent stage. The various stages can be extended to the point of becoming distinct or accelerated to the extent of making the successive stages almost simultaneous.

The foamant polymer or alkylene oxide-addition product of the first stage is prepared by reaction of an alkylene oxide with tetramethylolcyclohexanol in the presence of a catalyst, preferably an alkaline catalyst. The resulting reaction products are identified as the hydroxypolyalkyleneoxy ethers of tetramethylolcyclohexanol which are characterized by the presence in their molecular structure of hydroxyl-terminated chains of alkylene links, substituted or unsubstituted, which are connected to one another by means of recurring divalent oxy groups. The addition products are believed to be mixtures of isomers which contain products generally represented by the formula:

(I)
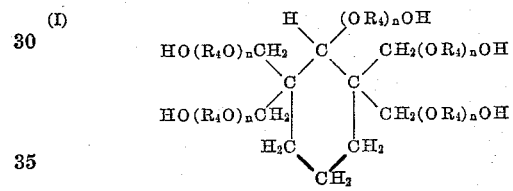

in which $R_4$ is a member of the class of ethylene radicals, propylene radicals or mixtures thereof; and $n$ is a number of at least 1. The alkylene oxide addition products shown above are well known materials and have been described in the literature. The procedure for reacting ethylene oxide or propylene oxide with tetramethylolcyclohexanol is adequately described in U.S. Patent 2,652,418.

The amount of alkylene oxide reacted with tetramethylolcyclohexanol is chosen with a view to the characteristics desired in the foamant and in the foamed product. For the alkylene oxide addition products described herein which have utility as intermediates in the preparation of urethane foams, the molecular weights, based on the hydroxyl value, can range from about 450 to 10,000 or more. To obtain such products having the desired molecular weights the tetramethylolcyclohexanol starting material is treated with the 1,2-alkylene oxide until each adduct represented in Formula I above by —$(OR_4)_nOH$ contains at least one mole of alkylene oxide, and preferably about three moles. Within these limits, of course, the addition of alkylene oxide to each hydroxyl can be balanced or unbalanced, i.e., each may contain approximately the same or different average number of alkylene oxide groups per chain. For high molecular weight products the total moles of alkylene oxide reacted with each hydroxyl group can range from one to about 100 moles, or more.

As a general guide urethane foams of maximum rigidity are prepared by the use of foamants within a molecular weight range of about 450 to 1250; for semirigid foams the molecular weight of the foamant should be about 800 to 1800; and for flexible open-cell foams the foamant should be of increased chain length and have a molecular weight of about 1800 to 6000.

It is to be understood that the alkylene oxide-tetramethylolcyclohexanol addition products include not only the products prepared by reaction of a single alkylene oxide but also those involving the reaction of two different alkylene oxides. It is also to be understood that the terms "foamant," "foamant polymer" and "alkylene oxide-tetramethylolcyclohexanol addition product" are used interchangeably to identify the hydroxypolyalkyleneoxy ethers of tetramethylolcyclohexanol illustrated in Formula I, supra.

The foaming operation can be carried out continuously or batchwise. The one-shot method, involving substantially simultaneous isocyanate extension of the foamant, cross linking and foam formation, is the most direct and economical. The semiprepolymer technique, involving partial extension of the foamant with excess isocyanate followed by foaming and network development at a later stage, is desirable when the final processing is to be kept to a minimum. It is also desirable, in the case of flexible foams, to form a prepolymer by pre-reacting molar equivalents of the foamant and isocyanate in the absence of water and thereafter producing a foam by the addition of excess isocyanate, a catalyst, water and a surfactant.

The amount of polyisocyanate reacted with the foamant polymer in preparation of a flexible, rigid or semirigid foam should be in excess of the equivalent amount required for reaction with each hydroxyl group of the foamant. The amount employed will be sufficient to have present in the total mass at least more than one equivalent of polyisocyanate, regardless of how combined, per equivalent of the foamant polymer. In other words, the amount of isocyanate compound employed must be such that there is more than the theoretical amount required to form a urethane linkage by reaction of hydroxyl and isocyanato groups. In accordance therewith, the amount of polyisocyanate employed is from about 1.05 to 7, preferably 2 to 6, equivalents per equivalent of foamant polymer.

The reaction of the foamant polymer with excess isocyanate, such as a diisocyanate, can be illustrated by the formula:

(II)

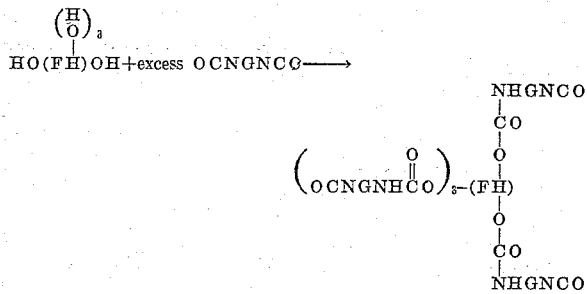

in which FH stands for the alkylene oxide-tetramethylolcyclohexanol product of the first stage exclusive of the terminal hydroxyl groups and G stands for an aliphatic, cycloaliphatic or aromatic diisocyanate, exclusive of the reactive isocyanato groups, such as m- and p-phenylene diisocyanates; 2,4- and 2,6-toluene diisocyanates; 2,3,5,6-tetramethyl-para-phenylene diisocyanate; o-, m-, and p-xylylene diisocyanates; 4,4'-biphenylene diisocyanate; 3,3'-dimethyl-4,4'-biphenylene diisocyanate; 3,3'-dimethoxy-4,4'biphenylene diisocyanate; p,p'-bibenzyl diisocyanate; p,p'-diphenylmethane diisocyanate; 4,4'-methylene-bis-ortho-tolyl diisocyanate; 1,5-naphthalene diisocyanate; tetramethylene diisocyanate; hexamethylene diisocyanate; and various other diisocyanates such as those listed in the table of Siefken (Annalen 562, pages 122–135) (1949).

Branched isocyanate-modified foamant polymers are also obtainable, in accordance with the invention, by reacting the foamant polymer with an isocyanate having more than two reactive isocyanato groups, as illustrated by the equation:

(III)

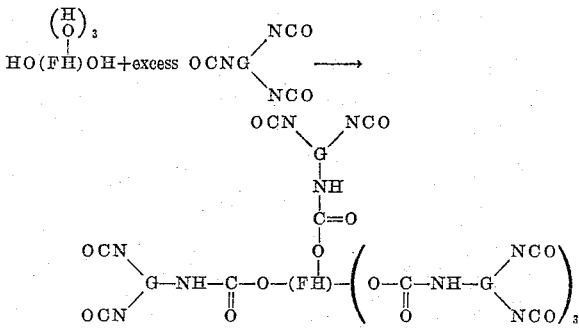

A number of suitable higher functional polyisocyanates are listed in the table of Siefken, referred to earlier. One of the more attractive types of polyisocyanates useful for this purpose is the product (IV)

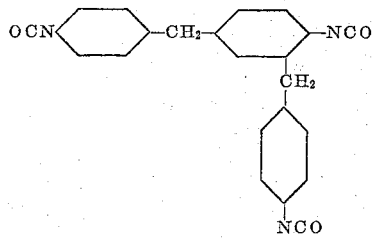

as well as the isomers thereof, obtainable by phosgenation of the reaction product of aniline and formaldehyde.

The reaction of the foamant polymer with the polyisocyanate, which is exothermic, can be accomplished at temperatures varying from room temperature, i.e., about 24° C., up to temperatures of about 200° C. The upper limit of reaction temperature is based on the thermal stability of the foamant-isocyanate reaction product whereas the lower limit is determined by the lowest economical rate of reaction. Generally at temperatures below about 75° C. the reaction is too slow to be feasible unless a catalyst is employed. At temperatures higher than about 300° C. there is danger of destructive decomposition of the reactants and reaction products. If the isocyanate-modified foamant is a prepolymer and is to be stored before use, it is preferable to carry out the reaction with isocyanate in the absence of a catalyst and at temperatures within the range of about 80 to 120° C. The time of reaction will vary of course depending upon temperature as well as upon the absence or presence of a catalyst or retarder and the identity thereof.

It is often desirable in the preparation of a prepolymer to add a retarder during or after the isocyanate reaction especially if the isocyanate-modified foamant is intended to be stored. This not only slows down, as the name implies, the rate of reaction between hydroxyl and isocyanato groups, but also inhibits reaction between the urethane groups formed and the isocyanato groups. Among the suitable retarders are acids such as hydrochloric acid, sulfuric acid, phosphoric acid, boric acid, various organic acids, organic acid halides such as acetyl chloride and acetyl bromide, sulfonyl halides such as para-toluene sulfonyl chloride, inorganic acid halides such as phosphorous tribromide, phosphorus trichloride, phosphorus oxy chloride, sulfonyl chloride and thionyl chloride, as well as sulfur dioxide and acidic sulfones.

When it is desired to form a foam, a mixture of the isocyanate-modified foamant and excess unreacted isocyanate is mixed with water, preferably in the presence of a catalyst. This involves several reactions that proceed simultaneously. One illustrated schematically in the equation:

(V)  2 ... GNCO+H$_2$O ⟶ ... GNHCONHG ... +CO$_2$ involves the reaction between the isocyanato groups and water to form urylene links and carbon dioxide. This reaction has the important effect of producing carbon dioxide in situ for forming the voids of the final foamed product and also of linking the terminal isocyanato groups and thereby extending the isocyanate-modified foamant. Another of the reactions involves recation of the urylene links so formed with unreacted isocyanato groups to form biuret cross links as illustrated by the equation:

(VI)

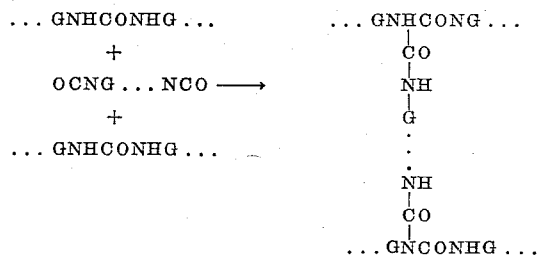

In addition, the free isocyanates react with one another, as shown in Equation VI; and with the isocyanate represented in Equations III to V to form chains of isocyanate residues connected to one another and to the isocyanate-modified foamants by urylene groups. The formation of a good foam depends upon a simultaneous development of carbon dioxide and a cross linking of the molecules to trap the carbon dioxide and thus prevent collapse of the foam.

Depending upon the desired density of the foam and the amount of cross linking desired, the amount of water added should be such that the ratio of equivalents of water to residual isocyanate equivalent, i.e., the isocyanate which is present as excess isocyanate over the reactive groups of the foamant polymer, is preferably kept within the range of from 0.5:1.0 to 1.5:1.0 and most preferably within a range of about 0.8:1 to 1.2:1.

The foaming operation also can be effected by means of a blowing agent, such as a low boiling, high molecular weight gas, which vaporizes at or below the temperature of the foaming mass. In rigid foams intended for use as thermal insulators the incorporation of a gas lowers its heat conductivity. Hence when a fluorocarbon gas such as trichloromonofluoromethane, "Ucon 11," is used in blowing rigid foams, a lower K-factor is obtained than in rigid foams of equal density blown with air or carbon dioxide. The reactions that occur during this type operation include formation of the urethane linkage as well as the formation of isocyanate dimers and trimers. In addition, another reaction that can occur is the formation of allophanate structures, as illustrated by the equation:

(VII)

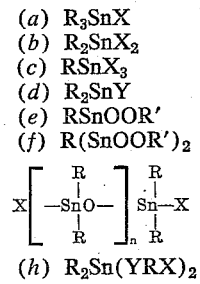

Preferred blowing agents are the fluorocarbons such as trichloromonofluoromethane; dichlorodifluoromethane; dichlorofluoromethane; 1,1-dichloro-1-fluoroethane; 1-chloro, 1,1-difluoro, 2,2-dichloroethane; and 1,1,1-trifluoro, 2-chloro-2-fluoro, 3,3-difluoro, 4,4,4,-trifluorobutane. The amount of blowing agent used will vary with density desired in the foamed product. In general it may be stated that for 100 grams of resin mix containing an average NCO/OH ratio of 1 to 1, about 0.005 to 0.3 mole of gas are used to provide densities ranging from 30 to 1 lb. per cubic foot. If desired, water may be used in conjunction with the blowing agent.

Catalysts that are suitable for the foaming and cross linking of curing reaction include inorganic and organic bases such as sodium hydroxide, sodium methylate, sodium phenolate, tertiary amines and phosphines. Particularly suitable amine catalysts include 2,2,1-diazabicyclooctane, trimethylamine, 1,2-dimethylimidazole, triethylamine, diethyl cyclohexylamine, dimethyl long-chain $C_{12}$ to $C_{18}$ amines, dimethylamino-ethanol, diethylaminoethanol, N-methyl morpholine, N-ethyl morpholine, triethanolamine and the like. Other suitable catalysts include arsenic trichloride, antimony trichloride, antimony pentachloride, antimony tributoxide, bismuth trichloride, titanium tetrachloride, bis(cyclopentadienyl) titanium difluoride, titanium chelates such as octylene glycol titanate, dioctyl lead dichloride, dioctyl lead diacetate, dioctyl lead oxide, trioctyl lead chloride, trioctyl lead hydroxide, trioctyl lead acetate, copper chelates such as copper acetylacetonate, and mercury salts.

Organic tin compounds characterized by at least one direct carbon to tin valence bond are also suitable as catalysts for the foaming reaction. Among the many types of tin compounds having carbon to tin bonds, of which specific representative compounds have been rested and shown to be active, are tin compounds having the general formulae set forth below:

(a) $R_3SnX$
(b) $R_2SnX_2$
(c) $RSnX_3$
(d) $R_2SnY$
(e) $RSnOOR'$
(f) $R(SnOOR')_2$ (g) $$X\left[ \begin{array}{c} R \\ -Sn O- \\ R \end{array} \right]_n \begin{array}{c} R \\ Sn-X \\ R \end{array}$$

(h) $R_2Sn(YRX)_2$ in which the R's represent hydrocarbon or substituted hydrocarbon radicals such as alkyl, aralkyl, aryl, alkaryl, alkoxy, cycloalkyl, alkenyl, cycloalkenyl, and analogous substituted hydrocarbon radicals, the R"'s represent hydrocarbon or substituted hydrocarbon radicals such as those designated by the R's or hydrogen or metal ions, the X's represent hydrogen, halogen, hydroxyl, amino, alkoxy, substituted alkoxy, acyloxy, substituted acyloxy, acyl radicals or organic residues connected to tin through a sulfide link, and the Y's represent chalcogens including oxygen and sulfur.

Among the compounds of group (a) that deserve special mention are trimethyltin hydroxide, tributyltin hydroxide, trimethyltin chloride, trimethyltin bromide, tributyltin chloride, trioctyltin chloride, triphenyltin chloride, tributyltin hydride, triphenyltin hydride, triallyltin chloride, and tributyltin fluoride.

The compounds in group (b) that deserve particular mention and are representative of the group include dimethyltin diacetate, diethyltin diacetate, dibutyltin diacetate, dioctyltin diacetate, dilauryltin diacetate, dibutyltin dilaurate, dibutyltin maleate, dimethyltin dichloride, dibutyltin dichloride, dioctyltin dichloride, diphenyltin dichloride, diallyltin dibromide, diallyltin diiodide, bis-(carboethoxymethyl)-tin diiodide, dibutyltin dimethoxide, dibutyltin dibutoxide, $(C_4H_9)_2Sn[OCH_2(CH_2OCH_2)_{x-1}CH_2OCH_3]_2$ (in which $x$ is a positive integer), dibutyl-bis[O-acetylacetonyl]-tin, dibutyltin-bis(thiododecoxide), and

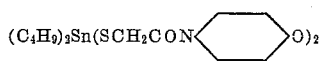

all readily prepared by hydrolysis of the corresponding dihalides. Many commercially available compounds used as stabilizers for vinyl resins are also included in this group.

Among the compounds that are representative of group (c) are butyltin trichloride, octyltin trichloride, butyltin triacetate and octyltin tris(thiobutoxide).

Typical among the compounds of group (d) are dimethyltin oxide, diethyltin oxide, dibutyltin oxide, dioctyltin oxide, dilauryltin oxide, diallyltin oxide, diphenyltin oxide, dibutyltin sulfide, [HOOC(CH$_2$)$_5$]$_2$SnO,

[CH$_3$OCH$_2$(CH$_2$OCH$_2$)$_{x-1}$CH$_2$]$_2$SnO and [CH$_3$OCH$_2$(CH$_2$OCH$_2$)$_{x-1}$CH$_2$O(CH$_2$)$_5$]$_2$SnO (in which the $x$'s are positive integers).

Methylstannonic acid, ethylstannonic acid, butylstannonic acid, octylstannonic acid, HOOC(CH$_2$)$_5$—SnOOH, (CH$_3$)$_3\overset{\oplus}{\text{N}}$(CH$_2$)$_5$SnOOH CH$_3$OCH$_2$(CH$_2$OCH$_2$)$_{x-1}$CH$_2$SnOOH and CH$_3$OCH$_2$(CH$_2$OCH$_2$)$_{x-1}$CH$_2$O(CH$_2$)$_5$SnOOH are examples of group (e) catalysts and group (f) catalysts are represented by HOOSn(CH$_2$)$_x$SnOOH and HOOSnCH$_2$(CH$_2$OCH$_2$)$_x$CH$_2$SnOOH the $x$'s being positive integers.

Typical compounds in group (g) include compounds as poly(dialkyltin oxides) such as dibutyltin basic laurate and dibutyltin basic hexoxide.

Other compounds that are efficient catalysts are those of group (h), of which the organo-tin compounds used as heat and light stabilizers for chlorinated polymers and available under the trade names Advastab 17–M (a dibutyl tin compound believed to contain two sulfur-containing ester groups), Advastab T–50–LT (a dibutyl tin compound believed to contain two ester groups), are typical, as well as many other organo-tin compounds available under such trade names as "Advastab," "Nuostabe" and "Thermolite."

If desired, the above catalysts can be used to accelerate the reaction of the foamant polymer with isocyanate, particularly if the isocyanate-modified foamant is formed immediately before use to form a foam, or if the foaming operation is made continuous.

The rigidity or flexibility of the final foam product is influenced by the degree of branching in the molecular structure as well as by the molecular weight of the foamant polymer. Highly branched chain structures and shortened chain lengths from the center of the foamant molecule to the terminal hydroxyl group tend to trap carbon dioxide bubbles as rapidly as they are formed and to produce rigid foams of closed-cell structure whereas lengthened chain structures favor production of open-celled flexible foams.

In order to stabilize the composition during the foaming operation and to avoid breaking of the CO$_2$ bubbles in the early stages of the foaming, it is advantageous to employ a small percentage, e.g., about 0.001 to 10 percent by weight, based on the total ingredients, of a stabilizing or thickening agent such as methoxylated cellulose, available on the market as "Methocel," ethoxylated cellulose, available as "Ethocel," hydroxy ethylated cellulose, available as "Cellosize," benzyl cellulose, acetyl cellulose, acetylbutyryl cellulose, hydroxy ethylated polyvinyl alcohol, polyvinyl chloride, vinyl chloride-vinyl acetate copolymers, polyvinyl acetate, polyvinyl butyral, polymeric methylmethacrylate, polymeric butylmethacrylate, high molecular weight polyethylene oxide, bentone and metallic soaps of fatty acids such as aluminum stearate.

It is within the scope of the invention to add fillers such as clays, powdered aluminum, or diatomaceous earths in quantities up to 20 percent by weight, based on the weight of total ingredients. Dyes may also be added prior to the foaming step and are often desirable since polyurethane foams normally exhibit a slight tendency to yellow on aging.

It is also within the scope of the invention to employ small amounts, e.g., about 0.1 to 5 percent by weight, based on the total ingredients, of an emulsifying agent such as polyoxyethylene sorbitan mono- and triacylates, commercially available as "Tweens," or a siloxane-oxyalkylene copolymer having from about 10 to 80 percent by weight of siloxane polymer and from 90 to 20 percent by weight of alkylene oxide polymer, such as the copolymers described in U.S. Patent 2,834,748. Although the use of an emulsifier is desirable to influence the type of foam structure that is formed, the foam products of the invention can be prepared without emulsifiers.

The foam products of the invention can readily be prepared to have, in addition to the characteristics already referred to, densities advantageously within the range of about 1.0 to 30 lbs. per cubic foot. Within this range, densities of the order of 1.5 to 15 lbs. per cubic foot are generally preferred for rigid structural foams.

The utility and advantages of the product and methods of the invention will become more apparent from the following examples included to illustrate the best modes now contemplated for carrying out the invention.

In evaluating the compression properties of the foams produced in the various examples, a foam cube of 2 x 2 x 2 inches was subjected to a compression load in an Instron tester and a load-deflection curve was obtained. The maximum compressive strength is given in lbs. per square inch (p.s.i.) either at the yield point or at 10 percent deflection.

*Example I*

220 grams of 2,2,6,6-tetrakis(hydroxymethyl)cyclohexanol and 7 grams of potassium t-butoxide are charged to a reactor maintained at a temperature of about 115° C. 580 grams of propylene oxide are added at a rate sufficient to maintain a pressure between 28 to 33 p.s.i. in the reactor. When the reaction is complete the residue is diluted with isopropanol, treated with Dowex 50 ion exchange resin and then stripped. The product obtained has a hydroxyl No. of about 333.5.

140 grams of the propylene oxide adduct as above prepared is mixed with 0.89 gram of dibutyltin dilaurate, 1.3 grams of a silicone oil surfactant (a siloxane-oxyalkylene copolymer) and 41 grams of trichloromonofluoromethane, "Ucon 11." 76.5 grams of a mixture of 80 percent 2,4- and 20 percent 2,6-tolylene diisocyanates are added under intensive agitation. As soon as the foaming reaction begins, the mixture is transferred to an open mold and allowed to cure for 10 minutes at 70° C. The test results analyze as follows:

Density, lbs./cu. ft. _____ 1.9
Maximum compression, lbs./sq. in. at 4.1 percent deflection _____ 26
Percent closed cells _____ 82

*Example II*

200 grams of the propylene oxide adduct of tetramethylolcyclohexanol as prepared in Example I are mixed with 2.1 grams of water, 0.9 gram of a silicone oil surfactant (a siloxane-oxyalkylene copolymer) and 0.4 gram of dioctyltin oxide. 126 grams of a mixture of 80 percent of 2,4- and 20 percent 2,6-tolylene diisocyanates are added under intensive agitation. When the foaming reaction begins, the mixture is transferred to an open mold and allowed to cure for 10 minutes at 70° C. The foamed product has a density of about 4.0 lbs./cu. ft.

*Example III*

220 grams of 2,2,6,6-tetrakis(hydroxymethyl)cyclohexanol is reacted with a mixture of 10 moles of ethylene oxide and 10 moles of propylene oxide using the procedure described in Example I. The product which is obtained has a hydroxyl No. of about 226.

140 grams of the alkylene oxide adduct as prepared above are mixed with 0.5 gram of dibutyltin dichloride, 1.0 gram of a silicone oil surfactant (a siloxane-oxyalkylene copolymer) and 35 grams of trichloromonofluoromethane. 51 grams of mixture of 80 percent of 2,4- and 20 percent 2,6-tolylene diisocyanates are added under intensive agitation. When the foaming reaction begins, the mixture is transferred to an open mold and allowed to cure for 10 minutes at 70° C. The foamed product has a density of about 2.5 lbs./cu. ft.

*Example IV*

220 grams of 2,2,6,6-tetrakis(hydroxymethyl)cyclohexanol is reacted with 50 moles of propylene oxide using the procedure described in Example I. The alkylene oxide adduct has a hydroxyl No. of about 90.

150 grams of the alkylene oxide adduct prepared above is mixed with 0.5 gram of dibutyltin diacetate, 0.1 gram of triethylamine, 3.75 grams of water, and 1.0 gram of a silicone oil surfactant (a siloxane oxyalkylene copolymer). 58 grams of a mixture of 80 percent 2,4- and 20 percent 2,6-tolylene diisocyanates are added under intensive agitation. When the foaming reaction begins, the mixture is transferred to an open mold and allowed to cure for 15 minutes at 120° C. The foamed product is flexible and has a density of about 2.2 lbs./cu. ft.

What is claimed is:

1. A foamed polymer comprising a network of isocyanate-modified hydroxypolyalkyleneoxy ethers of tetramethylolcyclohexanol in which said ethers are connected to organic polyisocyanate residues by means of urethane groups, said ethers having the formula:

(I) 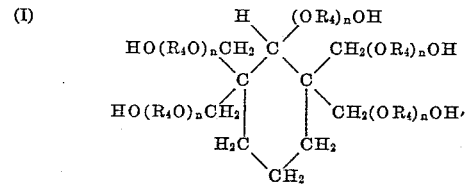

in which $R_4$ is a member selected from the group consisting of ethylene radicals, propylene radicals and mixtures thereof; and $n$ is a number of at least 1.

2. The foamed polymer of claim 1 wherein $R_4$ is an ethylene radical.

3. The foamed polymer of claim 1 wherein $R_4$ is a propylene radical.

4. A foamed polymer comprising a network of isocyanate-modified hydroxypolyalkyleneoxy esters of tetramethylolcyclohexanol in which the ethers are connected to organic polyisocyanate residues by meas of urethane groups which in turn are connected by urylene groups and biuret cross links to other organic polyisocyanate residues and isocyanate-modified hydroxypolyalkyleneoxy ethers of tetramethylolcyclohexanol, said ethers having the formula:

(I) 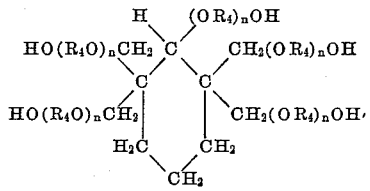

in which $R_4$ is a member selected from the group consisting of ethylene radicals, propylene radicals and mixtures thereof; and $n$ is a number of at least 1.

5. The foamed polymer of claim 4 wherein said ether has a molecular weight within the range of about 450 to 10,000.

6. A method for preparing rigid, cellular polyurethane foams from hydroxypolyalkyleneoxy ethers of tetramethylolcyclohexanol having a molecular weight of about 450 to 1250 prepared by reaction of alkylene oxide selected from the group consisting of ethylene oxide and propylene oxide with tetramethylolcyclohexanol which comprises catalytically reacting said ethers with at least an equivalent amount of an organic polyisocyanate in the presence of a low-boiling fluorocarbon, and permitting the temperature of the reaction mixture to rise above the boiling point of said fluorocarbon whereby a rigid, cellular polyurethane foam is produced.

7. The method of claim 6 wherein the fluorocarbon is trichloromonofluoromethane.

References Cited in the file of this patent

UNITED STATES PATENTS

| | | |
|---|---|---|
| 2,843,568 | Benning et al. | July 15, 1958 |
| 2,866,774 | Price | Dec. 30, 1958 |